(12) United States Patent
Cadra et al.

(10) Patent No.: US 10,040,885 B2
(45) Date of Patent: Aug. 7, 2018

(54) METHOD FOR PREPARING POLYMERIC MATERIALS COMPRISING ONE OR SEVERAL METAL ELEMENTS

(71) Applicant: COMMISSARIAT A L'ENERGIE ATOMIQUE ET AUX ENERGIES ALTERNATIVES, Paris (FR)

(72) Inventors: Stephane Cadra, Saint-Avertin (FR); Pierre Pouponneau, Joue-les-Tours (FR); Alexia Balland Longeau, Tours (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/117,112

(22) PCT Filed: Feb. 6, 2015

(86) PCT No.: PCT/EP2015/052530
§ 371 (c)(1),
(2) Date: Aug. 5, 2016

(87) PCT Pub. No.: WO2015/118116
PCT Pub. Date: Aug. 13, 2015

(65) Prior Publication Data
US 2017/0088649 A1    Mar. 30, 2017

(30) Foreign Application Priority Data

Feb. 6, 2014   (FR) ...................... 14 50910

(51) Int. Cl.
| C08F 30/04 | (2006.01) |
| C08F 212/14 | (2006.01) |
| C08J 9/28 | (2006.01) |
| C08F 212/36 | (2006.01) |
| C08F 8/42 | (2006.01) |
| C08J 9/36 | (2006.01) |

(52) U.S. Cl.
CPC .............. *C08F 212/14* (2013.01); *C08F 8/42* (2013.01); *C08F 212/36* (2013.01); *C08J 9/286* (2013.01); *C08J 9/36* (2013.01); *C08J 2201/0543* (2013.01); *C08J 2325/02* (2013.01); *C08J 2325/18* (2013.01)

(58) Field of Classification Search
USPC .......................................... 526/241; 558/388
See application file for complete search history.

(56) References Cited

U.S. PATENT DOCUMENTS

2011/0137000 A1* 6/2011 Alexia ................. C07C 229/14
526/241
2012/0217432 A1* 8/2012 Balland Longeau . C07C 251/48
252/62.54

FOREIGN PATENT DOCUMENTS

WO    2009/047245 A1    4/2009
WO    2011/061229 A1    5/2011

OTHER PUBLICATIONS

L. Moreau, et al., "Recent advances in development of materials for laser target," Laser and Particle Beams, XP008127624, vol. 27, No. 4, Jan. 1, 2009, pp. 537-544.*
C. Croix, et al., "New Gold-Doped Foams by Copolymerization of Organogold (I) Monomers for Inertial Confinement Fusion (ICF) Targets," Journal of Inorganic and Organometallic Polymers and Materials, XP055147703, vol. 18, No. 3, Feb. 28, 2008, pp. 334-343.*
Jiuyang Zhang, et al., "Cobaltocenium-Containing Methacrylate Homopolymers, Block Copolymers, and Heterobimetallic Polymers via RAFT Polymerization," Macromolecules, XP 055147970, vol. 45, No. 17, Sep. 11, 2012, pp. 6857-6863.*
International Search Report dated Apr. 17, 2015, in PCT/EP2015/052530 filed Feb. 6, 2015.
French Search Report dated Oct. 21, 2014, in French Application FR 1450910 filed Feb. 6, 2014.

* cited by examiner

Primary Examiner — Mark Kaucher
Assistant Examiner — Henry Hu
(74) Attorney, Agent, or Firm — Oblon, McClelland, Maier & Neustadt, L.L.P.

(57) ABSTRACT

A method for preparing a polymeric material doped with at least one first metal element and at least one second metal element, including: a) copolymerization of a first monomer containing a first metal element and of a second monomer containing a chelating group of a second metal element, to obtain a polymeric material containing (i) recurrent units deriving from the polymerization of the first monomer, the recurrent units containing the first metal element and (ii) recurrent units deriving from the polymerization of the second monomer, the recurrent units containing chelating groups of a second metal element, and when the first metal element is different from the second metal element, b) contacting the material from a) with a solution containing the second metal element, in return for which the second metal element is complexed with the chelating groups, where b) is optional when the first and second metal element are identical.

17 Claims, No Drawings

METHOD FOR PREPARING POLYMERIC MATERIALS COMPRISING ONE OR SEVERAL METAL ELEMENTS

TECHNICAL FIELD

The present invention relates to a novel method for preparing polymeric materials, in particular, polymeric foams, comprising one or several metal elements, for which the content of these metal elements may be easily adjusted according to the needs of the application.

These materials, because of the combination of organic and inorganic elements, may have interesting properties of a mechanical, thermal, electrical or magnetic nature.

These polymeric materials may notably, be used, in many applications wherein doping with metal elements is important, such as this is the case of supported catalysis, luminescent materials, magnetic materials, structured organometallic materials, materials for decontaminating organic and aqueous solutions, materials with an ionic imprint. In particular, they may find their application in the elaboration of laser targets used during fusion experiments by inertial confinement.

The general field of the invention is thus that of polymeric materials doped with one or several metal elements.

STATE OF THE PRIOR ART

Taking into account the extremely vast field of application of this type of materials, many teams focus their research on techniques for elaborating such materials, such as:
  (co)polymerization of monomers bearing the metal element; and
  incorporation of metal particles into a polymeric matrix.

As regards (co)polymerization of metal monomers, this technique is based on the principle of the presence of the metal element in the polymerization medium, this presence being generated by the use of monomers bearing the desired doping metal element, the metal element may be an integral part of the monomer molecule (in which case, this is referred to as metal monomers) or may be bound to the latter by a complexation reaction.

This technique however requires the availability or even the preparation of the monomers associated with the metal element, which may prove to be tedious and long in terms of application, when the question is to prepare a polymeric material doped with distinct metal elements.

Finally, as regards the incorporation of particles into a polymeric matrix, this technique consists of directly adding, into the polymeric matrix, the preformed metal particles, the size of the particles may vary from a nanometric scale to a micrometric scale. This technique gives the possibility of integrating specific metal particles according to the needs of the application. However, the physical mixing of the constitutive organic polymer(s) of the polymeric matrix and of the preformed metal particles may lead to the separation into two distinct phases or even to an agglomeration of said particles, which may be detrimental to the mechanical, electrical and/or optical properties of the resulting material. In order to circumvent these drawbacks, two possibilities may be contemplated:
  either the use of constitutive polymer(s) of the polymeric matrix, which interact with the surface of the particles;
  or the surface modification of the particles with view to promoting compatibility of the latter with the constitutive polymer(s) of the polymeric matrix, both of these possibilities however requiring a consequent development time.

Considering what exists, the inventors set their goal to proposing a novel method for preparing a polymeric material doped with one or several metal elements allowing, inter alia:
  incorporation of a broad diversity of metal elements;
  control of the content of the introduced metal elements, notably when the latter are distinct;
  simple application.

DISCUSSION OF THE INVENTION

Thus, the invention relates to a method for preparing a polymeric material doped with at least one first metal element and at least one second metal element, said at least one first metal element and said at least one second metal element being either identical or different from each other, said method comprising:

a) a step for copolymerization of at least one first monomer comprising at least one first metal element and of at least one second monomer comprising at least one chelating group of at least one second metal element, in return for which a polymeric material is obtained comprising recurrent units stemming from the polymerization of said first monomer, which recurrent units comprise said at least one first metal element and comprising recurrent units stemming from the polymerization of said second monomer, said recurrent units comprising chelating groups of at least one second metal element; and when said first metal element is different from said second metal element, said method comprising, in addition to a step b) for putting the material obtained in step a) in contact with a solution comprising said at least second metal element, in return for which said at least second metal element is complexed with the aforementioned chelating groups, this step b) being optional when said first metal element and said second metal element are identical.

In order to enter the description of this invention in more detail, we specify the following definitions.

By a monomer comprising at least one chelating group of at least one second metal element, is conventionally meant a monomer bearing at least one polymerizable group and comprising at least one pendant group able to form a complex with said at least one second metal element, which means, in other words, that said at least one second metal element is able to bind to said pendant group through a coordination bond by sharing a free doublet or through an ionic bond by sharing a negative charge borne by said pendant group with said at least one second metal element to be bound.

By metal element (whether this is the aforementioned first or second metal element), is conventionally meant an element belonging to the category of alkaline elements, earthalkaline elements, transition elements, lanthanide elements, actinide elements or elements selected from among Al, Ga, Ge, In, Sn, Sb, Tl, Pb, Bi and Po.

From this innovative method for elaborating polymeric materials doped with metal elements, result the following advantages:
  when said at least one first metal element is different from said at least one second metal element, it allows the incorporation, into the polymeric materials, of a broad diversity of metal elements, because this incorporation is based on a double choice: the selection of at least one first monomer comprising before polymerization said at least one first metal element and the selection of at least one second monomer for which the resulting recurrent units are able to bind to at least one second metal element through a simple coordination bond or ionic bond;

it gives the possibility of carrying out metal doping, or even controlled polymetal doping, said control may be regulated by simple adjustment of the ratios of the first monomer and of the second monomer during the copolymerization step a);

it is easily reproducible, notably as regards the level of the first metal element and of the second metal element present in the polymeric material because this level is related to the amount of first monomer and of second monomer;

when said first metal element and said second metal element are identical, it allows better incorporation of the metal monomer into the resulting material, without it being necessary to apply the contacting step b).

As mentioned above, the method of the invention firstly comprises a step for copolymerization of at least one first monomer comprising at least one first metal element and of at least one second monomer comprising at least one chelating group of at least one second metal element, in return for which a polymeric material is obtained, comprising recurrent units stemming from the polymerization of said first monomer, said recurrent units comprise said at least one first metal element and comprising recurrent units stemming from the polymerization of said second monomer, said recurrent units comprising chelating groups of at least one second metal element.

When said at least one first metal element is identical with said at least one second element, the method may not comprise the contacting step b). Indeed it was shown by the inventors that the copolymerization of a monomer comprising a given metal element in the presence of a monomer forming a complex with said metal element gives the possibility of obtaining a material having a content of the given metal element greater than that obtained only by the polymerization of the monomer comprising a metal element. In other words, a material comprising a metal element content approaching the theoretical content determined from the amount of monomer used comprising a metal element, which amounts to stating that the presence of the complexing monomer contributes to improving the yield of incorporation of the metal monomer in the material.

However, according to a particular embodiment of the invention, the method of the invention may comprise the application of step b), when said at least one first metal element and said at least one second metal element are identical.

When said at least one first metal element and said at least one second metal element are different, the method of the invention comprises the application of step a) and the application of step b).

Said first monomer comprising at least one first metal element may advantageously be an ethylenic monomer comprising at least one aromatic group to which is bound a group bearing at least one first metal element. Preferably, the ethylenic group is also bound to the aforementioned aromatic group.

Monomers fitting this definition are monomers fitting the following formula (I):

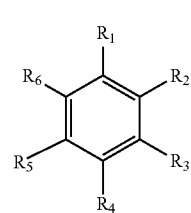

wherein:
R$_1$ is an ethylenic group;
R$_2$, R$_3$, R$_4$, R$_5$ and R$_6$ represent independently of each other, a hydrogen atom, a —OH group, an amine group, a —CHO group, an oxime group, a hydrazone group, a carboxyl group —COOH, a halogen atom, a trialkylsilane group, a group -M-L with M being the first metal element and L being a phosphine group, and optional salts thereof, provided that at least one of the groups R$_2$ to R$_6$ represents a group -M-L as defined above.

By amine group, is conventionally meant a primary amine group —NH$_2$, a secondary amine group (i.e., an amine group for which one of the hydrogen atoms initially borne by the nitrogen atom is substituted with another group, such as an alkyl group) or a tertiary amine group (i.e., an amine group for which both hydrogen atoms initially borne by the nitrogen atom are substituted with another group, such as an alkyl group).

By oxime group is conventionally meant a group comprising the function —C=N—OH, for example a group fitting the formula —CR'=NOH, wherein R' represents a hydrogen atom, an alkyl group, an aryl group, an alkylaryl group, a perfluoroalkyl group, a perfluoroaryl group, a perfluoroalkylaryl group, an acyl group, a carbonyl group, a trialkylsilane group.

By hydrazone group is conventionally meant a group comprising the function —C=N—N—, for example, a group fitting the formula —CR'=N—NR"R''', wherein R', R" and R''' represent, independently with each other a hydrogen atom, an alkyl group, an aryl group, an alkylaryl group, a perfluoroalkyl group, a perfluoroaryl group, a perfluoroalkylaryl group, an acyl group, a carbonyl group or a trialkylsilane group.

By halogen atom is conventionally meant according to the invention, an atom selected from fluorine, chlorine, bromine and iodine.

By alkyl group is conventionally meant according to the invention, in the foregoing and in the following, a linear or branched alkyl group comprising from 1 to 20 carbon atoms, a cyclic group comprising from 3 to 20 carbon atoms. From among these groups mention may be made of the methyl, ethyl, n-propyl, i-propyl, n-butyl, n-dodecanyl, i-butyl, t-butyl, cyclopropyl, cyclohexyl group. These groups may comprise in their chain one or several atoms selected from O, S, Se and/or N.

By aryl group is conventionally meant according to the invention in the foregoing and in the following, a group of 6 to 20 carbon atoms. Mention may be made from among these groups, of the benzyl, naphthyl, tolyl, biphenyl group.

By alkylaryl group is conventionally meant according to the invention in the foregoing and in the following, an aryl group with the same definition as the one given earlier, said group being substituted with at least one alkyl chain, which may include one or several atoms of O, N, Se and/or S.

By perfluoroalkyl, perfluoroaryl, perfluoroalkylaryl group, are meant groups for which the hydrogen atoms are totally substituted with fluorine atoms (the alkyls, aryls fitting the same definition as the one given earlier). For example, mention may be made of trifluoromethyl —CF$_3$, perfluoroethyl, perfluorobutyl, perfluoropropyl, perfluoropentyl, perfluorophenyl C$_6$F$_5$—, perfluorobiphenyl, perfluorobenzyl.

By phosphine group, is generally meant a group fitting the form —PX$_3$ with X being an alkyl group or an aryl group as defined above, suitable phosphine groups may be the triethylphosphine group or the triphenylphosphine group.

Suitable monomers falling under the aforementioned definition of the monomers of formula (I) are monomers for which the group -M-L is in a para position with respect to the group R$^1$, which is an ethylenic group, a particular monomer of this type being a monomer of the following formula (II):

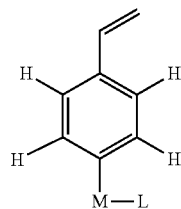

(II)

with M preferably being Au or In and L preferably being a triethylphosphine group or a triphenylphosphine group.

The first aforementioned monomer may be prepared prior to the application of step a). When this first monomer is of the type of those illustrated by the formula (I) above, it may be prepared, firstly by a reaction between a halogenated precursor (this halogenated precursor being different from the monomers of formula (I) by the fact that the M-L group(s) is (are) replaced with a halogen atom) and a lithium salt (for example butyllithium) and, in a second phase, by an organometal reaction between the thereby formed compound and a salt of formula Z-M-L, wherein Z is a halogen atom, M and L as for them being as defined above.

More specifically, when the question is to prepare a monomer of formula (II) as defined above, the reaction scheme may be the following:

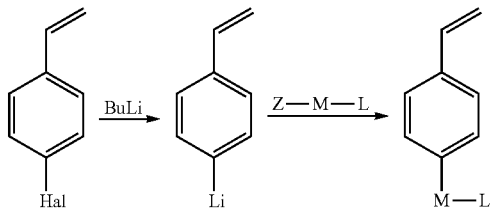

Hal corresponding to a halogen atom.

According to the invention, the second monomer may be a monomer comprising at least one group bearing a free doublet (which is thus the chelating group), in particular a nitrogen-containing group, such as an oxime group, an amine group, a heteroaromatic group comprising one or several nitrogen atoms, an alicyclic group comprising one or several nitrogen atoms, such as a cyclam group.

More specifically, the second monomer may be a cyclic monomer comprising at least one nitrogen-containing group, such a monomer may be selected from among:

aromatic monomers comprising an oxime group;

monomers comprising an alicyclic amine group, such as a cyclam group; and heteroaromatic monomers comprising one or several nitrogen atoms.

Aromatic monomers comprising an oxime group may be aromatic monomers comprising at least one aromatic ring, which ring bears at least one ethylenic group, at least one hydroxide group —OH and at least one oxime group.

Particular monomers according to this definition fit the following formula (III):

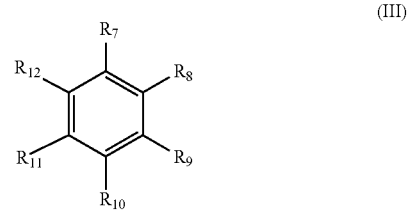

(III)

wherein:

R$_7$ is an ethylenic group;

R$_8$, R$_9$, R$_{10}$, R$_{11}$ and R$_{12}$ represent independently of each other, a hydrogen atom, an —OH group, an amine group, a —CHO group, an oxime group, a hydrazone group, a carboxyl group —COOH, a halogen atom, a trialkylsilane group, and optional salts thereof, provided that at least one of the groups R$_8$ to R$_{12}$ represents an —OH group and at least one of the groups R$_8$ to R$_{12}$ represents an oxime group.

Preferably, the —OH group and the oxime group are located in an ortho position respectively to each other on a same aromatic ring, for example, on a phenyl ring.

Thus, a particular monomer fitting this definition is a monomer fitting the following formula (IV):

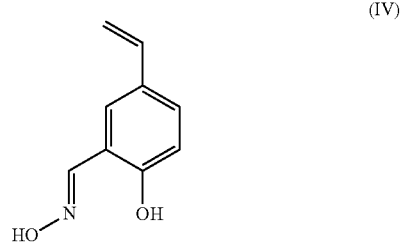

(IV)

Monomers comprising an alicyclic amine group, such as a cyclam group, may be monomers of the following formula (V):

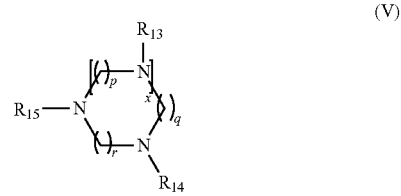

(V)

wherein:

$R_{13}$, $R_{14}$ and $R_{15}$ represent a styrenic group; and p, q, r, x are integers ranging from 0 to 20, provided that, when x is equal to 0, (r+q) is at least equal to 2, and when x is equal to 1, at least one of p, q, r is different from 0.

A particular monomer fitting this definition may be a monomer of the following formula (VI):

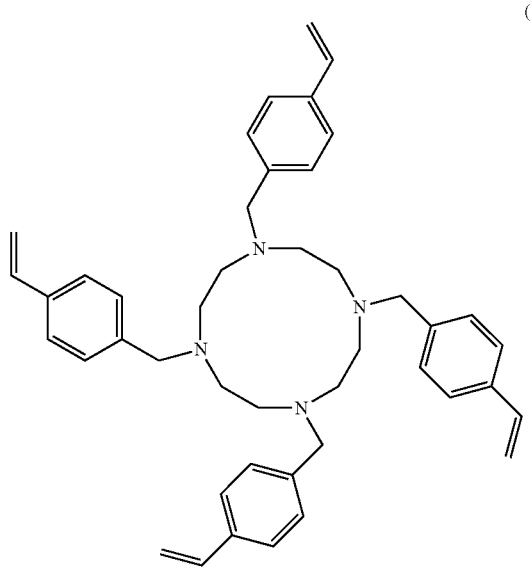

(VI)

Heteroaromatic monomers comprising one or several nitrogen atoms may be vinylimidazole monomers, such as a vinylimidazole monomer fitting the following formula (VII):

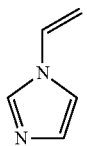

(VII)

In addition to the aforementioned monomers, the copolymerization step may be carried out in the presence of one or several comonomers, said comonomers generally being different from the aforementioned monomers.

These comonomers may be selected from among styrenic monomers or acrylate monomers.

Advantageously, the comonomers comprise at least two ethylenic groups thereby ensuring a role of a cross-linking agent. The thereby obtained materials have good mechanical strength.

Comonomers which may be used may be styrenic monomers of the following formula (VIII):

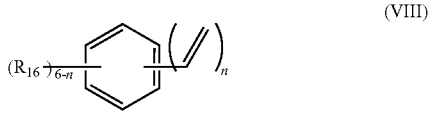

(VIII)

wherein the (6-n) $R_{16}$ groups either identical or different, represent a hydrogen atom, an alkyl group, an aryl group, an —O-aryl group, an —O-alkyl group, an acyl group, an alkylaryl group or a halogen atom, said alkyl, aryl, alkylaryl, —O-aryl, —O-alkyl groups being optionally perfluorinated and n is an integer ranging from 1 to 3, preferably, n being equal to 2.

In particular, a suitable comonomer may be divinylbenzene, in particular 1,4-divinylbenzene.

Comonomers which may be used may also be acrylate compounds of the following formula (IX):

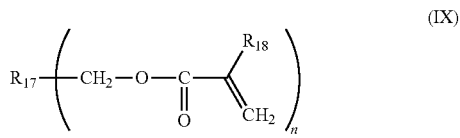

(IX)

wherein $R_{17}$ represent an alkyl group, $R_{18}$ represent H or an alkyl group and n is an integer ranging from 1 to 3.

In particular, a suitable comonomer of this type may be trimethylolpropanetriacrylate (known under the acronym of TMPTA) of the following formula (X):

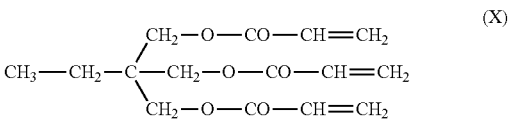

(X)

The copolymerization step is preferably carried out in the presence of at least one polymerization initiator, such as a radical initiator conventionally selected from among peroxide compounds, azonitriles (such as 2,2'-azobisisobutyronitrile (known under the acronym of AIBN), 2,2'-azodi(2,4-dimethyl-4-methoxyvaleronitrile) (also designated as V70), azoesters, azoamides.

The polymerization initiator may be introduced, into the polymerization medium, in variable amounts, for example, in amounts which may range from 0 to 50% by mass, based on the total mass of monomers set into play.

The polymerization step may be further carried out in the presence of a pore-forming solvent, which may be a polar, apolar organic solvent and may be selected from among ether solvents (such as tetrahydrofurane, 2-methyltetrahydrofurane, 3-methyltetrahydrofurane), dimethylsulfoxide, phthalate solvents (such as dimethylphthalate, dibutylphthalate), alcoholic solvents (such as methanol, ethanol), aromatic solvents (such as toluene, fluorobenzene), ketone solvents and mixtures thereof.

The polymerization mode may be of any type, such as heat polymerization (for example by heating from 50 to 150° C.) or such as photochemical polymerization in the presence of ultraviolet radiations.

In particular, step a) may be applied in the presence of a monomer of formula (II) with M being Au and L being a triethylphosphine group, a monomer of formula (VII) and of divinylbenzene.

At the end of step a), the material may appear as a gel, which may be, before optional application of step b), subject to washing in order to remove the organic solvent(s) used during step a) optionally followed, if necessary, by an operation for replacing the washing solvent present in the material with the solvent used for step b).

Step b) of the method consist in the contacting of the material obtained in step a) with a solution comprising said at least second metal element, in return for which said at least second metal element is complexed with the aforementioned chelating groups.

The solution may consist in an aqueous solution or in an organic solution (for example, an alcoholic solution comprising methanol and/or ethanol), in which is solubilized a salt or a metal complex of the metal element to be complexed with the polymeric material obtained in step a).

As examples of a metal salt or complex of a metal element, mention may be made of chlorides, bromides, fluorides, iodides, iodates, nitrates, sulfates, sulfonates, sulfites, nitrites, phosphates, phosphites, cyanides, azides, hydroxyls, chlorates, perchlorates, acetates, trifluoromethanesulfonates, trifluoroacetates, trichloroacetates, alkoxides, acetylacetonates, cyclopentadienyls, metal alcynides.

Specific examples of a metal salt may be $HAuCl_4$, $CuCl_2$, $Zn(NO_3)_2$, $CrCl_3$ or $Co(NO_3)_2$.

From a practical point of view, the contacting step b) may consist of immersing the material obtained in step a) into a solution comprising a salt or complex of at least one second metal element for a suitable time in order to impregnate the material obtained in step a) and to allow said at least one second metal element to form a complex with the recurrent units of the material obtained in step a) stemming from the polymerization of said at least one second monomer, thereby forming units making up the coordination complexes.

It is specified that, by coordination complex is conventionally meant a polyatomic structure comprising said at least one second metal element around which groups belonging to the aforementioned recurrent units are bound through coordination bonds, the coordination bond being generated by adding an electron doublet belonging to said recurrent units in an empty orbital of the metal element.

After this step b), the method of the invention may comprise a step for washing the thereby obtained material, so as to remove the solution comprising a stagnating salt or complex of a metal element in the porosity of the material. This washing step may consist of putting the material obtained at the end of step b), for example for a period of at least 24 hours, in contact with a solvent which will be exchanged with the solvent comprising the salt or complex of a metal element. This washing step may be renewed one or several times.

Finally, the method may comprise, after step b) and the optional washing step or after step a), when the latter is applied alone, a step for drying the obtained material. This drying step may consist of subjecting said material to heating, to freeze-drying or to drying with supercritical carbon dioxide $CO_2$.

Preferably, the drying step is a supercritical drying step with $CO_2$. To do this, this supercritical drying step with $CO_2$ may be preceded with a step for solvent exchange consisting of replacing the solvent present in the porosity of the material with a solvent miscible with $CO_2$. This supercritical drying step with $CO_2$ notably gives the possibility of being respectful of the physical integrity of the material.

By means of the method of the invention, polymeric materials doped with one or several metal elements are obtained, having a high percentage of a metal element and with a distribution on a molecular scale of the metal element within the material.

In particular, this may be polymeric materials doped with a single metal element (which is the case when the first metal element is identical with the second metal element). For example, this may be a polymeric material doped with gold, having a specific gravity of less than 100 $mg/cm^3$.

Still in particular, these may be polymeric materials doped with two distinct metal elements, this material may be described as "bimetal" polymeric materials.

For example, the first metal element may be gold and the second metal element may be copper.

Even if this clearly results from the definition of the invention (i.e. that the material comprises at least one first metal element integrated into the recurrent units from the polymerization of said at least one first monomer and at least one second metal element integrated into the recurrent units from the polymerization of said at least one second monomer, said second metal element being integrated by forming a complex after the polymerization step), it is specified that a bimetal material according to the invention does not correspond to:
- a «monometal» polymer grafted on monometal particles;
- a polymer containing bimetal particles, aggregates or clusters.

Thus, the invention relates to polymeric materials doped with at least one first metal element and at least one second metal element as defined above which may be obtained with a method as defined above, the materials conventionally appearing as foams.

These materials may be used in many domains requiring the application of materials doped with metal elements and notably in the elaboration of elements of laser targets in particular used in fusion experiments with inertial confinement.

They may also be used as a catalyst, as luminescent materials or as magnetic materials.

In particular, they may be used as an element of a laser target.

Finally, they may be used as materials with an ionic imprint. To do this, the doped materials obtained by the method of the invention may be subject to acid treatment, intended to remove a portion of the complexed metal elements in said material. The vacant sites thus form specific imprints of the specific element of the initially introduced metal. From this treatment, a material results therefrom, a so called material with an «ionic imprint», capable of selectively trapping the «printed» metal element upon contacting with a fluid comprising said metal element. This type of materials may thus be used for selective extraction of metals, notably during the reprocessing of effluents of nuclear fuels, such as the separation of lanthanides, or further the decontamination of biological fluids.

The invention will now be described with reference to the following examples given as an illustration and not as a limitation.

DETAILED DISCUSSION OF PARTICULAR EMBODIMENTS

Example 1

The present example illustrates the synthesis of a polymeric foam doped with gold according to the invention.

To do this, three steps are applied:
- a step for synthesis of a metal monomer (step a);
- a step for polymerization of said monomer in the presence of another complexing monomer and complexation of the resulting material (step b);
- a step for drying the resulting material in order to form a foam (step c).

a) Synthesis of a Metal Monomer

This step more specifically relates to the preparation of a metal monomer fitting the following formula:

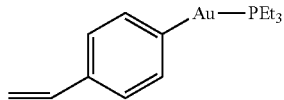

wherein Et corresponds to an ethyl group, this monomer being subsequently designated as StyAuPEt$_3$.

To do this, p-bromostyrene (0.75 g) is solubilized in tetrahydrofurane (8 mL) in a Schlenk tube under an inert atmosphere. After having cooled the contents of the tube to −80° C., butyllithium (1.62 mL) is added. To the resulting solution, is added drop wise gold chlorotriethylphosphine ClAuPEt (1 g) solubilized beforehand in tetrahydrofurane (16 mL). The resulting mixture is maintained, with stirring at −80° C. for 1 hour and then the temperature gradually rises up to room temperature. Stirring is maintained overnight. The mixture is then hydrolyzed, at a temperature of 0° C., with a saturated ammonium chloride solution (20 mL) and then this mixture is subject to extraction with diethyl ether (20 mL) twice. The collected organic phases are washed with a saturated sodium chloride solution (15 mL) and then dried with sodium sulfate before being evaporated by rotation in vacuo. The resulting product is kept at 4° C.

It corresponds to the monomer of the formula explicated above, as confirmed by the $^1$H NMR, $^{13}$C NMR and $^{31}$P NMR results below.

$^1$H NMR (THF-d8): δ (ppm): 1.22 (9H$_8$, m, J=7 Hz); 1.80 (6H$_7$, q, J=7 Hz); 5.11 (1H$_6$, dd, J=11/1.2 Hz); 5.69 (1H$_6$, dd, J=17.6/1.2 Hz); 6.69 (1H$_5$, dd, J=11/17.6 Hz); 7.33 (2Har, d, J=7.8 Hz); 7.49 (2Har, d, J=7.8 Hz)

$^{13}$C NMR (THF-d8): δ (ppm): 8.9 (3C$_8$); 17.8 (3C$_7$, d, J=30 Hz); 111.3 (C$_6$); 125.0 (2C$_3$); 134.4 (C$_4$); 137.8; 139.2 (2C$_2$ or 1C$_5$); 175.9 (C$_1$, d, J=116 Hz)

$^{31}$P NMR (THF-d8): δ (ppm): 42 b) Polymerization of Said Monomer in the Presence of Another Complexing Monomer

In a flask, the monomer StyAuPtEt$_3$ prepared in step a) (0.1232 g) is solubilized in tetrahydrofurane (1 mL). A complexing monomer, 1-vinylimidazole (designated as VI) (0.1232 g), an initiator, azobisisobutyronitrile (0.0308 g), a cross-linking agent, divinylbenzene (0.0616 g) and a pore-forming solvent, diethyl phthalate (6 mL) are added to the solubilized monomer StyAuPtEt$_3$. The solution is degassed in argon for 3 minutes. It is then injected into molds, which are placed in an inert chamber. The polymerization reaction is carried out at 60° C. for 24 hours. The resulting gels are then removed from the mold in an ethanol solution. The ethanol is changed three times, in order to remove diethyl phthalate and tetrahydrofurane.

The gels are then immersed in a solution (18 mL) comprising a gold salt HAuCl$_4$.3H$_2$O (Au: 8.9 mg/mL) for a period of 7 days. The gels are then subject to mechanical stirring.

c) Drying of the Material

The gels are then dried, in an autoclave, by supercritical drying with CO$_2$, for which the cycle of pressures and temperatures is the following: 50° C. at 180 bars for 30 hours with a CO$_2$ flow rate of 2.5 kg·h$^{-1}$. The negative pressure of the autoclave is then achieved at 50° C. at 0.5 bars·min$^{-1}$ down to room temperature.

Example 2

This example relates to the preparation of a polymeric foam doped with gold and with copper according to the invention.

To do this, two steps are applied:
a step for polymerization of the monomer StyAuPEt$_3$ in the presence of another complexing monomer and of complexing of the resulting material (step b);
a step for drying the resulting material in order to form a foam (step c).

a) Polymerization of the Monomer StyAuPEt$_3$ in the Presence of Another Complexing Monomer and Complexation of the Resulting Material In a flask, the monomer StyAuPtEt$_3$ (0.1232 g) is solubilized in tetrahydrofurane (1 mL). A complexing monomer, 1-vinylimidazole (designated as VI) (0.1232 g), an initiator, azobisisobutyronitrile (0.0308 g), a cross-linking agent, divinylbenzene (0.0616 g) and a pore-forming solvent, diethyl phthalate (6 mL) are added to the solubilized monomer StyAuPtEt$_3$. The solution is degassed in argon for 3 minutes. It is then injected into molds, which are placed in an inert chamber. The polymerization reaction is conducted at 60° C. for 24 hours. The resulting gels are then removed from the mold in an ethanol solution. The ethanol is changed three times, in order to remove diethyl phthalate and tetrahydrofurane.

The gels are then immersed in a solution (18 mL) comprising a copper salt CuCl$_2$ (Cu: 8.9 mg/mL) for a period of 24 hours. The gels are then subject to mechanical stirring.

The gel is then washed three times in ethanol after immersion in the copper solution.

b) Drying of the Material

The gels are then dried, in an autoclave, by supercritical drying with CO$_2$, for which the cycle of pressures and temperatures is the following: 50° C. at 180 bars for 30 hours with a CO$_2$ flow rate of 2.5 kg·h$^{-1}$. The negative pressure of the autoclave is then achieved at 50° C. at 0.5 bar·min$^{-1}$ down to room temperature.

Example 3

This example has the purpose of demonstrating the capability of the method of the invention of allowing optimization of the metal element content in a polymeric material but also, to a certain extent, the structural properties of the material.

To do this, two comparative tests were applied (tests a) and b) below), for which the specific gravity p (in mg/cm$^3$) and the gold content (in % by mass) were respectively measured, so as to be able to compare these values with those obtained with the material obtained in Example 1.

The operating procedures for preparing the materials of tests a) and tests b) are illustrated below.

a) Test a

The present example illustrates the synthesis of a polymeric foam doped with gold obtained by copolymerization of the monomer StyAuPEt$_3$ with divinylbenzene (respectively 50% by mass of StyAuPEt$_3$ and 50% by mass of divinylbenzene).

To do this, the metal monomer StyAuPt$_3$ (0.154 g) is solubilized with THF (2 mL). The initiator (AiBN, 0.0308 g), the cross-linking agent divinylbenzene (0.154 g) and the pore-forming solvent diethyl phthalate (6 mL) are added. The solution is degassed in argon for 3 minutes. It is injected into molds which are placed in an inert chamber. The polymerization is carried out at 60° C. for 24 hours. The gels are then removed from the molds in an ethanol solution. The ethanol is changed three times in order to remove the DEP and THF. Next, the gels are dried via a supercritical route with $CO_2$.

The obtained foam has a specific gravity p of 52±2 (in $mg/cm^3$) and a gold content of 10.1±0.4 (in % by mass).

b) Test b

The present example illustrates the synthesis of a polymeric foam doped with gold obtained by copolymerization of the monomer VI with divinylbenzene (respectively 50% by mass of monomer VI and 50% by mass of divinylbenzene) followed by impregnation with a gold salt.

To do this, in a flask, the complexing monomer 1-vinylimidazole (VI, Sigma Aldrich) (0.154 g), the initiator (AIBN, 0.0308 g), the cross-linking agent divinylbenzene (DVB, 0.154 g) and the pore-forming solvent diethylphthalate (DEP, 6 mL, Sigma Aldrich) are added. The solution is degassed in argon for 3 minutes. It is injected into molds which are placed in an inert chamber. The polymerization is conducted at 60° C. for 24 hours. The gels are then removed from the molds in an ethanol solution. The ethanol is changed three times in order to remove the DEP. Next, the gels are immersed in a gold solution ($HAuCl_4$ in ethanol (18 mL), Au=8.9 mg/mL) for 7 days. The resulting gels are then washed three times with ethanol and then dried via a supercritical route with $CO_2$.

The obtained foam has a specific gravity p of 89±4 (in $mg/cm^3$) and a gold content of 26±1 (in % by mass).

As a comparison, the foam obtained in Example 1 according to the method of the invention has a specific gravity p of 71±4 (in $mg/cm^3$) and a gold content of 34.4±1.4 (in % by mass).

Thus, the association of a metal monomer and of a complexing monomer according to the conditions of the method of the invention gives the possibility of optimizing the properties of the resulting material. More specifically, within the scope of the synthesis of polymeric foams based on gold, the association of the metal monomer $StyAuPEt_3$ with the complexing monomer VI gives the possibility of increasing the metal element content relatively to that obtained with the material of the test a) and that of the test b). Further, the method of the invention gives the possibility of obtaining massive materials having a high metal content and a lower specific gravity than the one obtained with the material obtained with the metal monomer of test a) and greater than the one obtained with the material obtained with the complexing monomer of test b). Thus, the method of the invention allows optimization of the metal element content but also to a certain extent allows control of the structural properties of the material.

Example 4

This example has the purpose of demonstrating the capability of the method of the invention of giving the possibility of obtaining mechanically reinforced materials as compared with materials made without the impregnation step according to the invention.

To do this, two tests were applied:
- a comparative test (test a) not compliant with the invention illustrating the preparation of a foam obtained, inter alia, by copolymerization of $StyAuPEt_3$ and of the monomer VI;
- a test according to the invention (test b) for preparing a foam obtained, inter alia, by copolymerization of $StyAuPEt_3$ and of the monomer VI followed by impregnation with a gold salt.

The operating procedures for preparing the materials of tests a) and of tests b) are illustrated below.

a) Test a

The present example illustrates the synthesis of a polymeric foam obtained by a method not compliant with the invention, by copolymerization of the $StyAuPEt_3$ monomer with divinylbenzene.

To do this, in a flask, the metal monomer $StyAuPEt_3$ (0.1232 g) is solubilized with THF (2 mL, Sigma Aldrich). The complexing monomer 1-vinylimidazole (VI, Sigma Aldrich) (0.1232 g), the initiator (AIBN, 0.0308 g), the cross-linking agent divinylbenzene (DVB, 0.0616 g) and the pore-forming solvent diethylphthalate (DEP, 6 mL, Sigma Aldrich) are added. The solution is degassed in argon for 3 minutes. It is injected into molds which are placed in an inert chamber. The polymerization is conducted at 60° C. for 24 hours. The gels are then removed from the molds in an ethanol solution. The ethanol is changed three times in order to remove the DEP. The resulting gels are then dried via a supercritical route with $CO_2$.

The obtained foam, after supercritical drying with $CO_2$, has a poor mechanical strength, which is notably materialized by a deformation of the latter during the drying. Further, the obtained foam may easily be broken.

b) Test b

The present example illustrates the synthesis of a polymeric foam according to the invention.

To do this, in a flask, the metal monomer $StyAuPEt_3$ (0.1232 g) is solubilized with THF (2 mL, Sigma Aldrich). The complexing monomer 1-vinylimidazole (VI, Sigma Aldrich) (0.1232 g), the initiator (AIBN, 0.0308 g), the cross-linking agent divinylbenzene (DVB, 0.0616 g), the pore-forming solvent diethylphthalate (DEP, 6 mL, Sigma Aldrich) are added. The solution is degassed in argon for 3 minutes. It is injected into molds which are placed in an inert chamber. The polymerization is conducted at 60° C. for 24 hours. The gels are then removed from the mold in an ethanol solution. The ethanol is changed three times in order to remove the DEP. Next, the gels are immersed in a gold solution ($HAuCl_4$ in ethanol (18 mL), Au=8.9 mg/mL) for 7 days. The resulting gels are then washed three times with ethanol and then dried via a supercritical route with $CO_2$.

At the end of the supercritical drying with $CO_2$, the obtained foam is slightly deformed, which confirms its better mechanical strength, which may be ascribed to the complexation of the silver salt by the recurrent units stemming from the polymerization of the monomer VI.

Because of its better mechanical strength, the foam is thus be more easily handled.

Example 5

This example has the purpose of demonstrating the capability of the method of the invention of allowing optimization of the metal element content by means of the presence of the complexing monomer.

To do this, three tests were applied (tests a), b) and c) below), for which the theoretical gold content was determined (in % by mass) and for which the gold content (in % by mass) was measured.

The operating procedures for preparing the materials of tests a), b) and c) are illustrated below.

a) Test a

The present example illustrates the synthesis of a polymeric foam obtained by polymerization of the monomer $StyAuPEt_3$ and of divinylbenzene (50% by mass of each of the monomers)

To do this, in a flask, the metal monomer StyAuPEt$_3$ (0.154 g) is solubilized with THF (1 mL, Sigma Aldrich). The initiator (AIBN, 0.0308 g), the cross-linking agent divinylbenzene (DVB, 0,154 g), the pore-forming solvent diethylphthalate (DEP, 6 mL, Sigma Aldrich) are added. The solution is degassed in argon for 3 minutes. It is injected into molds which are placed in an inert chamber. The polymerization is conducted at 60° C. for 24 hours. The gels are then removed from the molds in an ethanol solution. The ethanol is changed three times in order to remove the DEP and the THF. Next, the gels are dried via a supercritical route with CO$_2$.

The obtained foam, after supercritical drying with CO$_2$, has an Au content of 12±3 (in % by mass), while the theoretical Au content was estimated to be 23 (in % by mass).

b) Test b

The present example illustrates the synthesis of a polymeric foam according to the invention (respectively 40% by mass of StyAuPEt$_3$, 40% by mass of monomer VI and 20% by mass of divinylbenzene).

To do this, in a flask, the metal monomer StyAuPEt$_3$ (0.1232 g) is solubilized with THF (2 mL, Sigma Aldrich). The complexing monomer 1-vinylimidazole (VI, Sigma Aldrich) (0.1232 g), the initiator (AIBN, 0.0308 g), the cross-linking agent divinylbenzene (DVB, 0.0616 g), the pore-forming solvent diethylphthalate (DEP, 6 mL, Sigma Aldrich) are added. The solution is degassed in argon for 3 minutes. It is injected into molds which are placed in an inert chamber. The polymerization is conducted at 60° C. for 24 hours. The gels are then removed from the molds in an ethanol solution. The ethanol is changed three times in order to remove the DEP. The resulting gels are then dried via a supercritical route with CO$_2$.

The obtained foam, after supercritical drying with CO$_2$, has an Au content of 21.2±0.8 (in % by mass), while the theoretical Au content was estimated to be 19 (in % by mass).

b) Test c

The present example illustrates the synthesis of a polymeric foam according to the invention (respectively 50% by mass of StyAuPEt$_3$, 39% by mass of monomer VI and 11% by mass of divinylbenzene).

To do this, in a flask, the metal monomer StyAuPEt$_3$ (0.154 g) is solubilized with THF (2 mL, Sigma Aldrich). The complexing monomer 1-vinylimidazole (VI, Sigma Aldrich) (0.1232 g), the initiator (AIBN, 0.0308 g), the cross-linking agent divinylbenzene (DVB, 0.0308 g), the pore-forming solvent diethylphthalate (DEP, 6 mL, Sigma Aldrich) are added. The solution is degassed in argon for 3 minutes. It is injected into molds which are placed in an inert chamber. The polymerization is conducted at 60° C. for 24 hours. The gels are then removed from the molds in an ethanol solution. The ethanol is changed three times in order to remove the DEP. The resulting gels are then dried via a supercritical route with CO$_2$.

The obtained foam, after supercritical drying with CO$_2$, has an Au content of 22±0.9 (in % by mass), while the theoretical Au content was estimated to be 24 (in % by mass).

As a conclusion to these tests, it may be inferred that the presence of the complexing monomer VI in the application of the method of the invention gives the possibility of optimizing, without any impregnation step, the metal monomer content. The result of this is that the gold content in the material is close to the theoretical content. Without being bound by theory, this may be ascribed to the fact that the complexing monomer by establishing coordination bonds with the gold comprised in the metal monomer allows better incorporation of the metal monomer in the resulting material.

The invention claimed is:

1. A method for preparing a polymeric material doped with a first metal element and a second metal element, said first metal element and said second metal element being identical or different from each other, said method comprising:
   a) copolymerizing a first monomer comprising a first metal element of formula (I), a second monomer comprising a chelating group of a second metal element, and at least one comonomer selected from the group consisting of styrenic monomers and acrylic monomers, said comonomer comprising at least two ethylenic groups, to obtain a polymeric material:

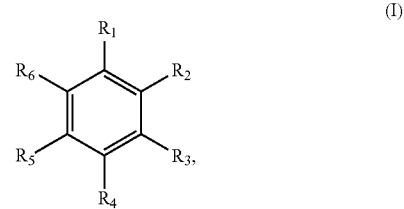

(I)

wherein

R$_1$ is an ethylenic group; and

R$_2$, R$_3$, R$_4$, R$_5$ and R$_6$ represent, independently of each other, a hydrogen atom, an —OH group, an amine group, a —CHO group, an oxime group, a hydrazone group, a carboxyl group —COOH, a halogen atom, a trialkylsilane group, a -M-L group with M being the first metal element and L being a phosphine group, and the optional salts thereof, provided that at least one of the groups R$_2$ to R$_6$ represent a -M-L group as defined above, wherein the second monomer is a cyclic monomer comprising at least one nitrogen-containing group selected from heteroaromatic monomers comprising at least one nitrogen atom, the polymeric material comprises
   recurrent units deriving from the polymerization of said first monomer, said recurrent units comprising said first metal element,
   recurrent units deriving from the polymerization of said second monomer, said recurrent units comprising chelating groups of said second metal element, and
   recurrent units deriving from the polymerization of said comonomer; and when said first metal element is different from said second metal element, said method further comprising
   b) contacting the polymeric material with solution comprising said second metal element, in order to complex said second metal element with the chelating groups,
wherein the contacting b) is optional when said first metal element and said second metal element are identical.

2. The method for preparing a material according to claim 1, wherein, when said first metal element and said second metal element are identical, the method does not comprise the contacting b).

3. The method for preparing a material according to claim 1, wherein, when said first metal element and said second metal element are different, the method comprises the copolymerization a) and the contacting b).

4. The method for preparing a material according to claim 1, wherein the first monomer is a monomer of formula (II):

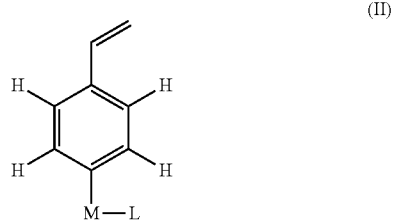

(II)

with M being Au or In and L being a triethylphosphine group or a triphenylphosphine group.

5. The method for preparing a material according to claim 1, wherein the second monomer is a vinylimidazole monomer of formula (VII):

(VII)

6. The method according to claim 1, wherein the comonomer is represented by one of the following formulae (VIII) or (IX):

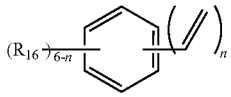

(VIII)

wherein the (6-n) $R_{16}$ groups either identical or different, represent a hydrogen atom, an alkyl group, an aryl group, an —O-aryl group, an —O-alkyl group, an acyl group, an alkylaryl group or a halogen atom, said alkyl, aryl, alkylaryl, —O-aryl, —O-alkyl groups being optionally perfluorinated and n is an integer ranging from 1 to 3;

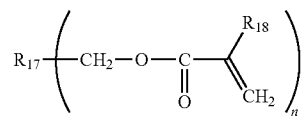

(IX)

wherein $R_{17}$ represent an alkyl group, $R_{18}$ represent H or an alkyl group and n being an integer ranging from 1 to 3.

7. The method according to claim 1, wherein the comonomer is divinylbenzene.

8. The method according to claim 1, wherein the copolymerization a) occurs in the presence of at least one polymerization initiator.

9. The method according to claim 1, wherein the copolymerization a) occurs in the presence of a pore-forming solvent, which is a polar, apolar organic solvent selected from the group consisting of an ether solvent, dimethylsulfoxide, a phthalate solvent, an alcoholic solvent, an aromatic solvent, a ketone solvent and mixtures thereof.

10. The method according to claim 1, wherein the copolymerization a) occurs with
a first monomer of formula (II):

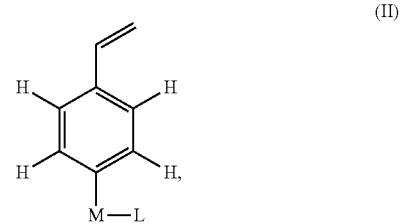

(II)

with M being Au and L being a tri ylphosphine group,
a second monomer of formula (VII):

(VII)

and
divinylbenzene.

11. The method according to claim 1, wherein the contacting b) comprises contacting the material a) with a solution comprising said second metal element, to obtain said second metal element complexed with the chelating groups.

12. The method according to claim 1, further comprising drying the material obtained in a) or a material obtained in the contacting b).

13. The method according to claim 12, wherein the drying is a supercritical drying.

14. The method according to claim 1, the first metal element is gold and the second metal element is copper.

15. The method according to claim 1, wherein the polymeric material is a foam.

16. A polymeric material obtained by the method of claim 1, wherein the polymeric material is doped with at least one metal element.

17. An element of a laser target, the element comprising the polymeric material of claim 16.

* * * * *